(88.)
C. H. LATHAM & JOHN S. LUGG.
Improvement in Revolving Casters.
No. 4,657.
Reissued Dec. 5, 1871.
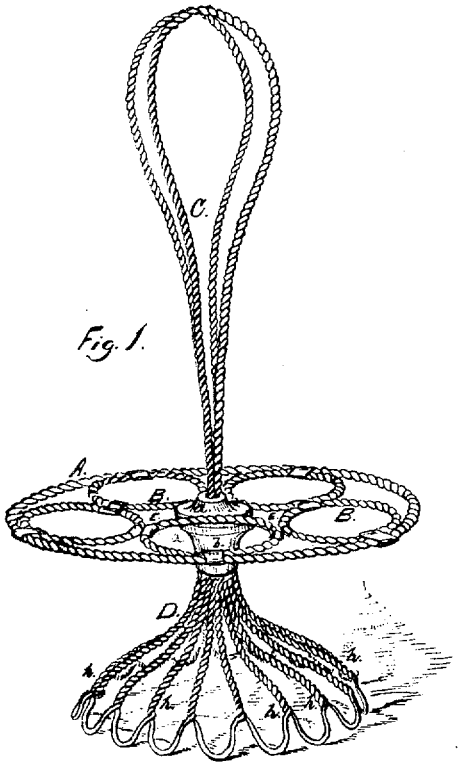
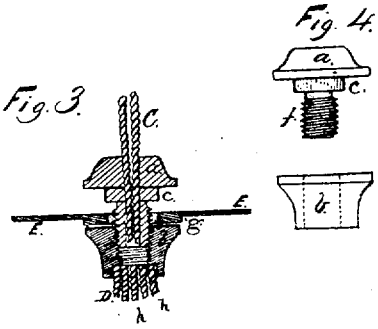
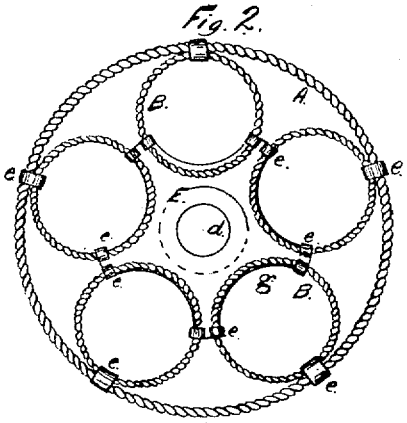
Witnesses: Edward A. Osborn
Robert H. Manners
Inventors: C. H. Latham & J. S. Lugg
By L. A. Deuzin Attyp.
AM. PHOTO-LITHOGRAPHIC CO. N.Y. (OSBORNE'S PROCESS.)

UNITED STATES PATENT OFFICE.

CYRUS H. LATHAM AND JOHN S. LUGG, OF LOWELL, MASSACHUSETTS, ASSIGNORS TO EDWARD P. WOODS, DANIEL SHERWOOD, AND CYRUS H. LATHAM.

IMPROVEMENT IN REVOLVING CASTERS.

Specification forming part of Letters Patent No. 116,722, dated July 4, 1871; reissue No. 4,657, dated December 5, 1871.

DIVISION B.

*To all whom it may concern:*

Be it known that we, CYRUS H. LATHAM and JOHN S. LUGG, of Lowell, in the county of Middlesex and State of Massachusetts, have invented a new and improved method of uniting the several ends of wire used in the construction of articles for domestic use, such as table-casters, holders, and stands for bottles, &c., of which the following is a specification:

In the construction of articles for domestic use, such as casters, holders for bottles, &c., of twisted wire, the great difficulty has been to unite or fasten the ends of the wires which form the contracted part of the article made securely and neatly at a common center or terminus. Our invention removes this difficulty; and consists in a novel manner of effecting this purpose.

The drawing accompanying this specification represents a table-caster made mostly of twisted wire.

Figure 1 of the drawing is a perspective view of a table-caster made in accordance with our invention. Fig. 2 is a view of the revolving frame carrying the bottles. Figs. 3 and 4 represent the form and arrangement of the screw and nut, the former being a sectional view and the latter a side elevation.

The base D of this caster is first formed in a machine which was patented to C. H. LATHAM April 18, 1871, to which reference is herewith made; and the special shape or configuration desired is given to it between dies or formers and then tinned or coated with metal. The ends of the wires *h*, forming the contracted part or terminus of the base D, have a nut, *b*, cast upon them of sufficient size for the strength required. The base is then put upon a former and the nut *b* turned and screw-threaded for the spindle *a;* or the thread of the screw may be molded; and in all cases where it can be so molded or cast in the nut we prefer to have it done, as it facilitates the operation of making the article. The bottles are held in a series of rings, B B, the outer parts of each clamped and secured to the outer ring A and the inner parts to the plate E, which is provided with a central hole, *d*, which revolves upon the smooth portion *c* of the spindle *a;* or the outer ring A may be dispensed with when desired. The handle is composed of strands of wire twisted up and bent, as shown in the drawing. The screw-spindle *a*, made of corresponding size with the nut *b*, is bored or cast hollow to receive the ends of the handle wires, which are inserted in place and soldered at the lower end in the screw *f;* or the handle may be cast to the part *a*, if desired. To the plate E, upon the under side, may be secured a washer, *g*, of proper thickness to give a suitable bearing for the plate E.

The rings B B are shown as clasped to the outer ring A and plate E; but this forms no part of our invention, as the same arrangement is found in patents heretofore granted to others, which have been assigned to Woods, Sherwood & Co., the assignees of our invention.

By casting the wires to a nut, as described, we are enabled to secure the ends of the radial arms or wires forming the parts of the articles securely in the proper position, and to cover their rough ends, which is of great importance in the manufacture thereof.

We claim as our invention—

1. Uniting a series of wires which form part of a holder for bottles and other like articles of domestic use to the collar or part *b* by casting them thereto, substantially in the manner and for the purposes set forth.

2. Constructing the handle C of twisted wire, substantially as described and specified.

3. The combination, with the part D united to the collar or nut *b*, handle C, and screw *a*, of the revolving plate E provided with bottle-rings B, constructed and operated substantially in the manner described and specified.

CYRUS H. LATHAM.
JOHN S. LUGG.

Witnesses for JOHN S. LUGG:
ISAAC V. HOLMES,
HARRY CLARKE.
Witnesses for CYRUS H. LATHAM:
L. A. MCARTHUR,
JAMES P. STEPHENS.

(88)